US010750597B2

(12) United States Patent
Hromin et al.

(10) Patent No.: US 10,750,597 B2
(45) Date of Patent: Aug. 18, 2020

(54) COLOR TEMPERATURE SENSOR

(71) Applicant: Crestron Electronics, Inc., Rockleigh, NJ (US)

(72) Inventors: Dennis Hromin, Park Ridge, NJ (US); Agnieszka Libson, River Edge, NJ (US); Benjamin Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 16/402,956

(22) Filed: May 3, 2019

(65) Prior Publication Data
US 2019/0342974 A1 Nov. 7, 2019

Related U.S. Application Data

(60) Provisional application No. 62/667,104, filed on May 4, 2018.

(51) Int. Cl.
| G01J 5/02 | (2006.01) |
| H05B 47/11 | (2020.01) |
| G01J 5/60 | (2006.01) |
| G02B 5/02 | (2006.01) |
| H05B 45/20 | (2020.01) |

(52) U.S. Cl.
CPC ............... H05B 47/11 (2020.01); G01J 5/60 (2013.01); G02B 5/0278 (2013.01); H05B 45/20 (2020.01)

(58) Field of Classification Search
CPC ... G01J 3/50; G01J 3/28; H04N 9/735; H04N 1/60
See application file for complete search history.

(56) References Cited

U.S. PATENT DOCUMENTS

| 2,904,355 A | 9/1959 | Creamer |
| 3,175,454 A | 3/1965 | Morse |
| 4,395,730 A | 7/1983 | Shen |
| 4,692,025 A | 9/1987 | Tani et al. |
(Continued)

FOREIGN PATENT DOCUMENTS

JP 02029192 A * 1/1990

OTHER PUBLICATIONS

Ams AG, TCS3472 Color Light-to-Digital Converter with IR Filter, ams Datasheet, [v1-02], Feb. 8, 2016.
(Continued)

*Primary Examiner* — Kiho Kim
(74) *Attorney, Agent, or Firm* — Crestron Electronics, Inc.

(57) ABSTRACT

A color temperature sensor assembly comprising a sensor body, a substantially dome shaped diffuser extending through an opening in the sensor body, a substantially flat diffuser disposed within the sensor body below the first diffuser, and a color temperature sensing module disposed below the flat diffuser and adapted to detect a color temperature of light collected by the dome shaped diffuser and the flat diffuser. The shape of the dome diffuser helps capture light from all angles to bring in more light to the sensor and provide more accurate readings. The secondary flat diffuser is adapted to further diffuse the light to reduce light concentration and prevent inaccurate readings. The color temperature readings from the color temperature sensor assembly may be used to control at least one lighting load.

22 Claims, 6 Drawing Sheets

(56) References Cited

U.S. PATENT DOCUMENTS

| | | | |
|---|---|---|---|
| 5,023,704 A | 6/1991 | Hieda et al. | |
| 5,193,900 A | 3/1993 | Yano et al. | |
| 5,363,153 A * | 11/1994 | Bailiff | G02C 11/00 |
| | | | 219/201 |
| 5,416,577 A | 5/1995 | Haggerty et al. | |
| 5,521,708 A | 5/1996 | Beretta | |
| 5,532,848 A | 7/1996 | Beretta | |
| 5,636,143 A | 6/1997 | Takahashi | |
| 5,721,471 A | 2/1998 | Begemann et al. | |
| 5,861,717 A | 1/1999 | Begemann et al. | |
| 6,396,040 B1 * | 5/2002 | Hill | G01J 1/4204 |
| | | | 250/205 |
| 6,430,996 B1 * | 8/2002 | Anderson | G01K 13/028 |
| | | | 73/170.26 |
| 7,446,303 B2 | 11/2008 | Maniam et al. | |
| 7,595,786 B2 | 9/2009 | Shih | |
| 7,604,360 B2 | 10/2009 | chen et al. | |
| 8,796,948 B2 | 8/2014 | Weaver et al. | |
| 9,066,405 B2 | 6/2015 | van de Ven | |
| 9,084,305 B2 | 7/2015 | Toda et al. | |
| 9,125,274 B1 | 9/2015 | Brunault et al. | |
| 9,189,996 B2 | 11/2015 | Casper et al. | |
| 9,210,761 B2 | 12/2015 | Nackaerts et al. | |
| 9,345,090 B2 | 5/2016 | Tiberi et al. | |
| 9,451,667 B2 | 9/2016 | Trattler | |
| 9,480,122 B2 | 10/2016 | Trattler et al. | |
| 9,538,603 B2 | 1/2017 | Shearer et al. | |
| 9,572,231 B2 | 2/2017 | Simonian et al. | |
| 9,578,714 B2 | 2/2017 | Kim et al. | |
| 9,622,321 B2 * | 4/2017 | Creasman | G01J 1/0403 |
| 9,661,722 B2 | 5/2017 | Patel | |
| 2014/0320024 A1 | 10/2014 | Helmar | |
| 2015/0289340 A1 | 10/2015 | van de Ven | |
| 2016/0073470 A1 | 3/2016 | Casper et al. | |
| 2017/0162547 A1 * | 6/2017 | Bergmann | H01L 33/62 |
| 2017/0238392 A1 | 8/2017 | Shearer et al. | |

OTHER PUBLICATIONS

Avago Technologies, APDS-9250 Digital RGB, IR and Ambient Light Sensor, Data Sheet, AV02-4733EN, Nov. 13, 2015.

PALRAM Industries Ltd., PALSUN® Technical Guide, F815 Jan. 21, 2016 PBW.

Ams AG, AS7262 6-Channel Visible Spectral_ID Device with Electronic Shutter and Smart Interface, ams Datasheet, [v1-01] Mar. 17, 2017.

* cited by examiner

COLOR TEMPERATURE SENSOR

BACKGROUND OF THE INVENTION

Technical Field

Aspects of the embodiments relate to a color temperature and intensity sensor, including systems, methods, and modes for controlling color temperature of a lighting system.

Background Art

The lighting industry is starting to better understand the value in manipulating color temperature of light. Manipulation of artificial light as the primary circadian stimulus in buildings is now a hot trend in architectural lighting. All plants and animals have a biological clock that tells them when to wake and when to sleep, when to be alert and when to rest. This internal clock does not exactly measure the length of an astronomical 24-hour day. Instead, to keep our circadian rhythm in sync or entrained with an earthly day, the human body is sensitive to environmental stimuli, the most influential being the sunlight.

Medical research has identified various circadian rhythm disruptions, typically related to sleep, such as Delayed Sleep Phase Disorder (night owls), Advanced Sleep Phase Disorder (morning larks), Jet Lag, Shift Work Disorder, Non-24 (blind people getting day and night mixed up), and Narcolepsy. These, along with other health and wellbeing concerns, have put circadian rhythm and the non-visual effects of light at the forefront of the architectural lighting design community. Lighting can stimulate our circadian system to invoke entrainment or acute alertness in the architectural spaces we build. Quantitative metrics, such as the Circadian Stimulus (CS), help lighting designers collaborate with medical research to leverage manipulation of artificial light as the primary circadian stimulus in healthier well buildings.

When designing a space for circadian effect there are various objectives typically considered for a lighting system, including incident angle (the direction from which light enters the eye), spectrum (the color of light), intensity (how bright or dark the light is), and dosage (the frequency and duration of light exposure). Studies have suggested that changes of color temperature plays a major role in regulating the internal circadian rhythm, without which the internal clock can become out of alignment. Light intensity also affects the circadian rhythm and must be taken into consideration. As such, color and light intensity should be combined to provide a space that is not only safe and efficient, but also satisfies the circadian objectives.

A typical implementation of a circadian solution includes a color changing luminaire, a controller or a control processor, and a user interface that is flexible and easy to use. To properly design for spectrum, or color, the lighting luminaire contains an array of a plurality of light emitting diodes (LED) and a properly paired LED driver. The LED array may be a tunable white array (i.e. 2200K-6000K) or a full red-green-blue-white (RGB(W)) chipset. The LED driver may be digitally addressable via digital control protocols, such as DMX or DALI®, to more accurately reproduce color and light intensity. The color of a fixture may be also controlled using a 0-10V, phase (dim to warm), or PWM (tape lights) signals.

There considerable adjustments and tuning must be made to achieve or modify a circadian objective. Providing a solution that customers can easily understand and use is paramount. Typically, end users are provided with graphical user interfaces (GUIs), such as touch screens, mobile apps, or desktop apps, for manual adjustment of intensity and color temperature. For example, color temperature can be adjusted using color pickers by typing in the RGB value or Kelvin sliders to select a color by touch. However, such interfaces may become confusing and prone to human error. While a desired color temperature can be selected, this color temperature may not be optimal to achieve a circadian objective.

On the other hand, automatically adjusting the color temperature and intensity of light to synchronize with the natural circadian rhythm can create an optimal environment. In office spaces, circadian lighting control can help drive greater concentration, productivity, and creativity among workers. In healthcare environments, such as in a patient's room, it can promote faster healing, which translates into better outcomes, faster patient out-time, and cost savings. In classrooms, it can lead to better student behavior and concentration. And in hotels it can help guests acclimate their natural body rhythms to local time and thereby mitigate the effects of jet lag during the day. In addition to the physical benefits, the new WELL Building Standard® provides building owners and managers cost-saving deployment guidelines for building features that impact health and wellbeing, including lighting.

Accordingly, a need has arisen for systems, methods, and modes for a color temperature sensor that can automatically control color temperature of a lighting system based on natural sunlight readings.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a color temperature sensor that can automatically control color temperature of a lighting system based on natural sunlight readings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a color temperature sensor assembly is provided. The color temperature sensor assembly comprises a sensor body comprising an opening, a first diffuser extending through the opening in the sensor body and comprising a substantially dome shaped surface, and a second diffuser disposed within the sensor body below the first diffuser and comprising a substantially flat shaped surface. The color temperature sensor assembly further comprises a color temperature sensing module disposed below the second diffuser and adapted to detect a color temperature of light collected by the first diffuser and the second diffuser.

According to an embodiment, the sensor body may comprise a white plastic material adapted to reflect light. The color temperature sensor assembly may further comprise a light indicator disposed below the first diffuser, wherein the first diffuser is adapted to diffuse and disperse the light emitted from the light indicator to provide visual signal to a user.

According to an embodiment, the first diffuser is adapted to capture light at angles incident to the dome shaped surface of the first diffuser and scatter the light within the first diffuser. The second diffuser is adapted to further diffuse the light captured by the first diffuser and direct the light towards the color temperature sensing module. The second diffuser is further adapted to reduce dark shadows within the sensor body. According to a further embodiment, the second diffuser is adapted to collect light that comes in at a steep angle with respect to the first diffuser and direct the light towards the color temperature sensing module. According to an embodiment, the second diffuser comprises a material with a diffusion level that is higher than a diffusion level of a material of the first diffuser. The first diffuser and the second diffuser may comprise a white diffused material. According to yet another embodiment, at least one of the first diffuser and the second diffuser comprises a material with ultraviolet blocking properties adapted to allow transmission of natural daylight and to reflect infrared radiation.

According to an embodiment, the color temperature sensor assembly may further comprise at least one heating element disposed below the first diffuser, wherein the heating element is adapted to be selectively turned on to melt ice or snow accumulation on the first diffuser. The heating element may be disposed below the second diffuser. The second diffuser may comprise at least one cutout adapted to expose the heating element. The second diffuser may comprises a substantially circular shape or a substantially triangular shape. According to an embodiment, the color temperature sensor assembly further comprises at least one dehumidifier pad within the sensor body adapted to collect moisture and reduce fog accumulation on the first diffuser and the second diffuser.

According to a further embodiment, the first diffuser may comprise a flange, the sensor body may comprise a first housing portion threadably attached to a second housing portion, and each of the first housing portion and the second housing portion may comprise a circumferential channel adapted to receive an o-ring. The flange of the first diffuser may be adapted to be disposed between the circumferential channel of the first housing portion and the circumferential channel of the second housing portion such that the o-rings are compressed against the flange to form a water tight seal.

According to an embodiment, the color temperature sensor assembly further comprises at least one processor adapted to receive a color temperature reading from the color temperature sensing module and control at least one lighting load based on the color temperature reading. The color temperature sensor assembly may further comprise a light intensity sensing module, wherein the processor is adapted to compensate for the diffusion of the first diffuser and the second diffuser by adjusting a light intensity reading of the light intensity sensing module by an offset factor, wherein the processor is adapted to control at least one lighting load based on the adjusted light intensity reading.

According to another aspect of the embodiments a color temperature sensor assembly is provided comprising: a sensor body comprising an opening; a first diffuser extending through the opening in the sensor body and comprising a substantially dome shaped surface, wherein the first diffuser is adapted to capture light at angles incident to the surface of the first diffuser and scatter the light within the first diffuser; a second diffuser disposed below the first diffuser and comprising a substantially flat shaped surface, wherein the second diffuser is adapted to collect light that comes in at a steep angle with respect to the first diffuser; and a color temperature sensing module disposed below the second diffuser and adapted to detect a color temperature of the light collected by the first diffuser and the second diffuser.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
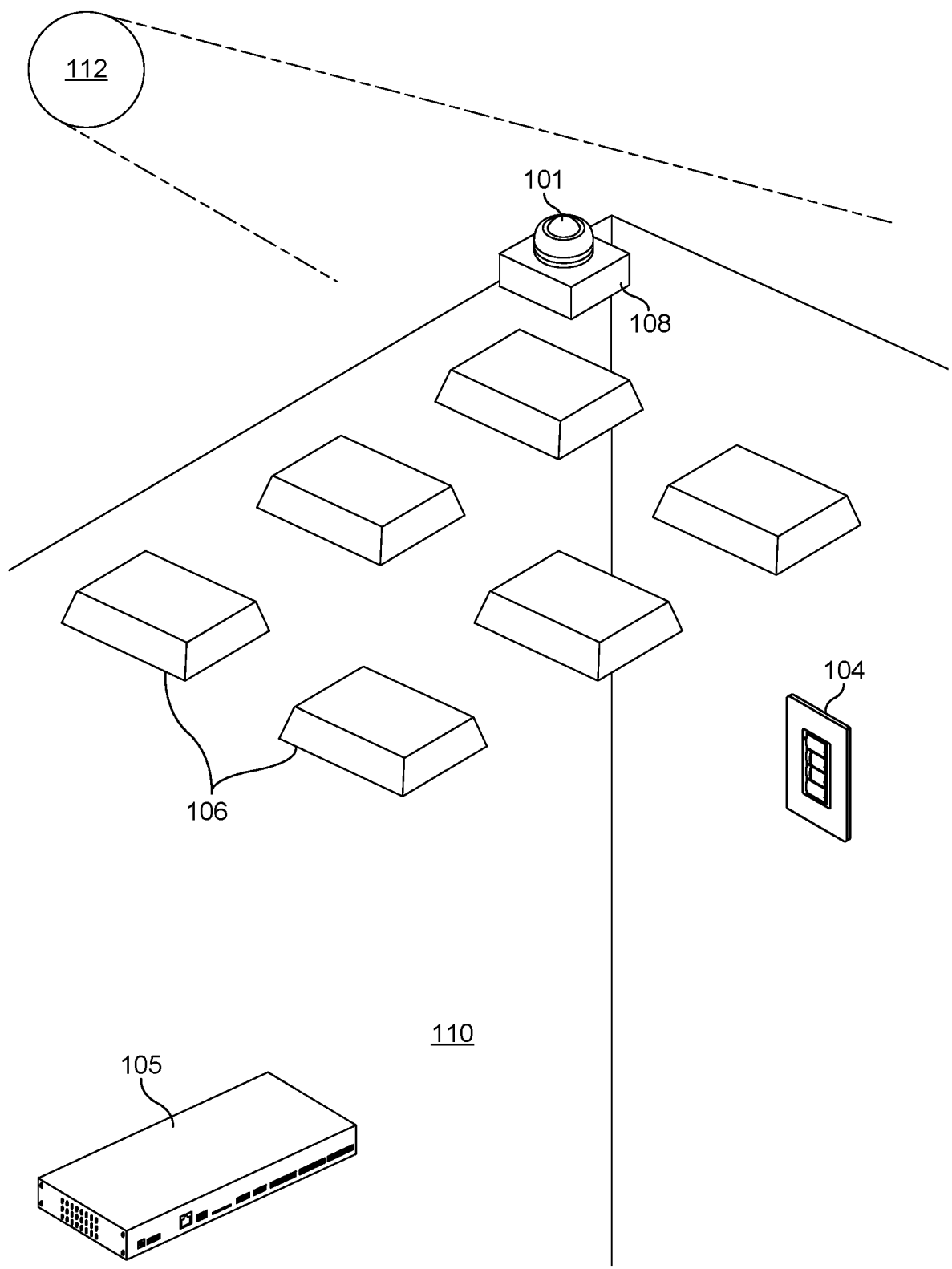

FIG. 1 illustrates a lighting control system comprising a color temperature sensor according to an embodiment.

Figure 2:
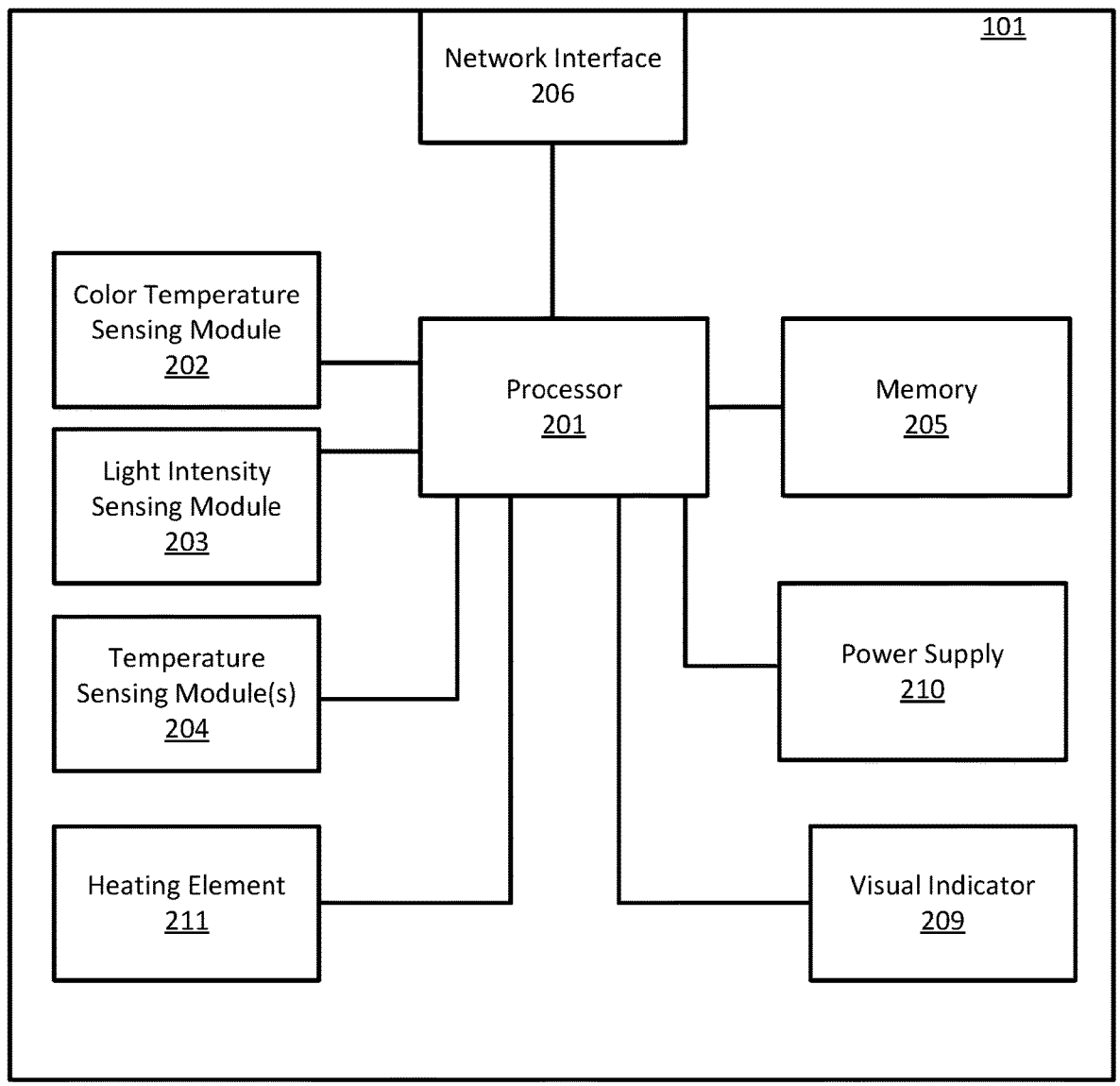

FIG. 2 illustrates a block diagram of the color temperature sensor according to an embodiment.

Figure 3:
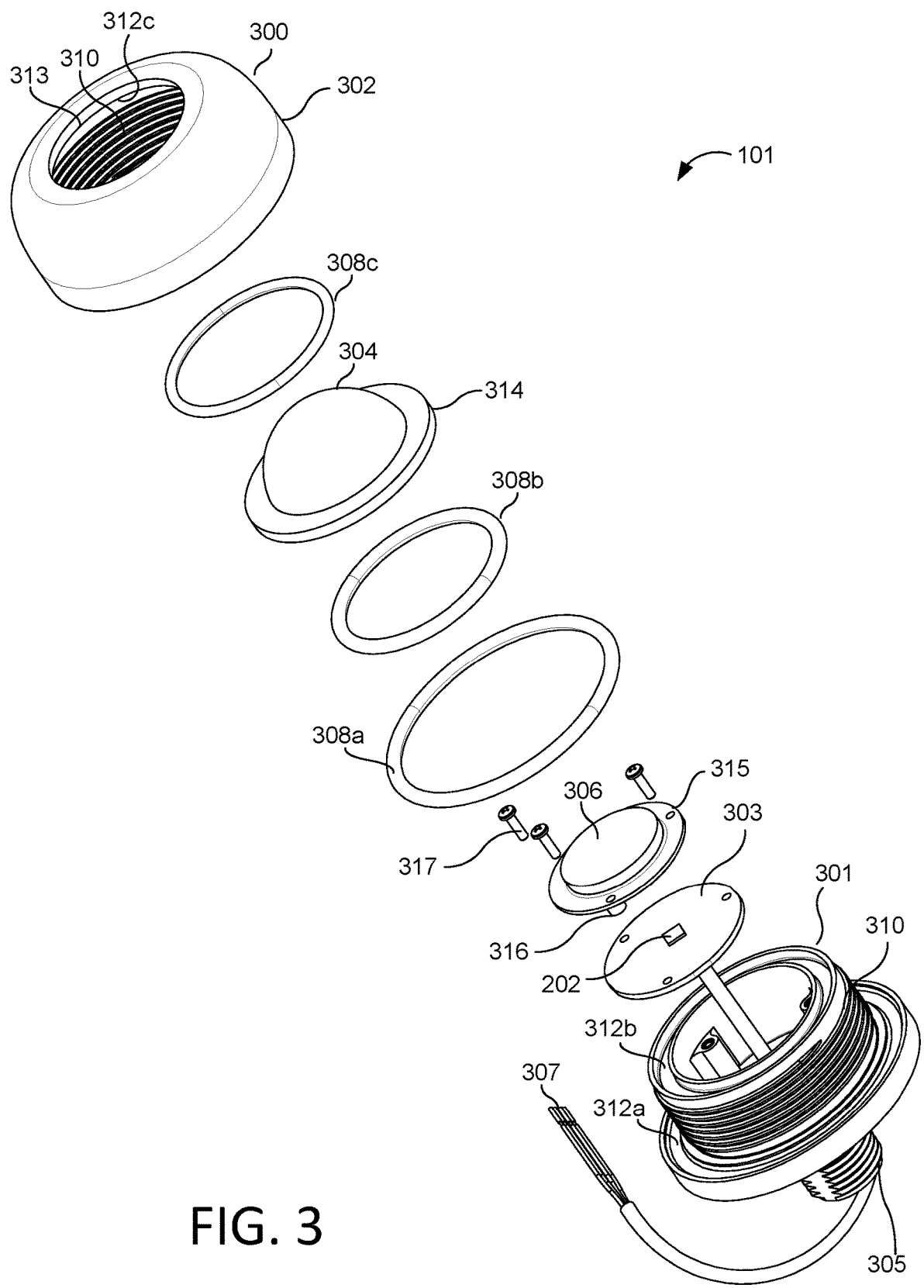

FIG. 3 illustrates an exploded view of the color temperature sensor according to an embodiment.

Figure 4:
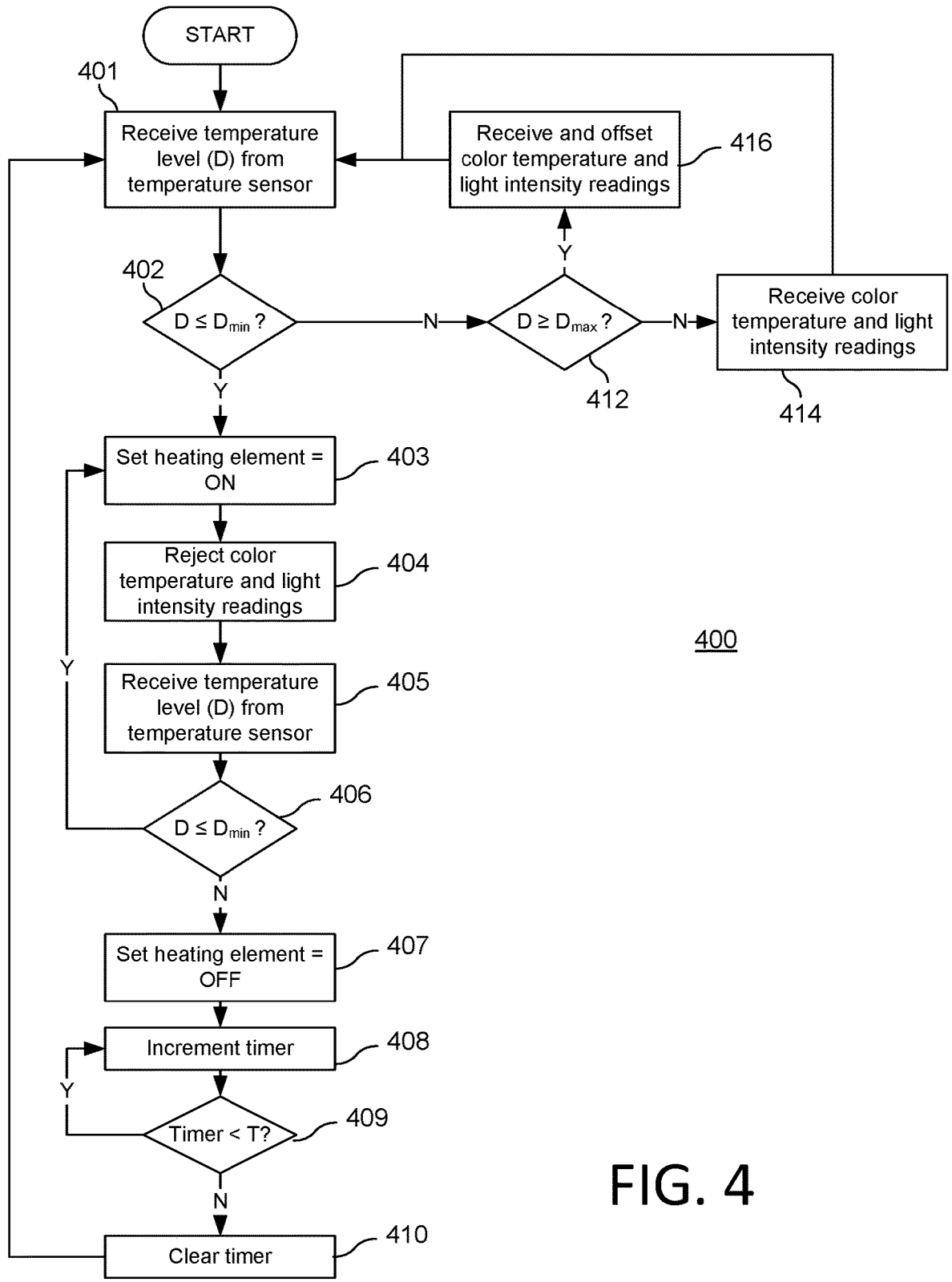

FIG. 4 shows a flowchart illustrating the steps for a method of correcting color temperature readings based on internal temperature of the color temperature sensor according to an embodiment.

Figure 5:
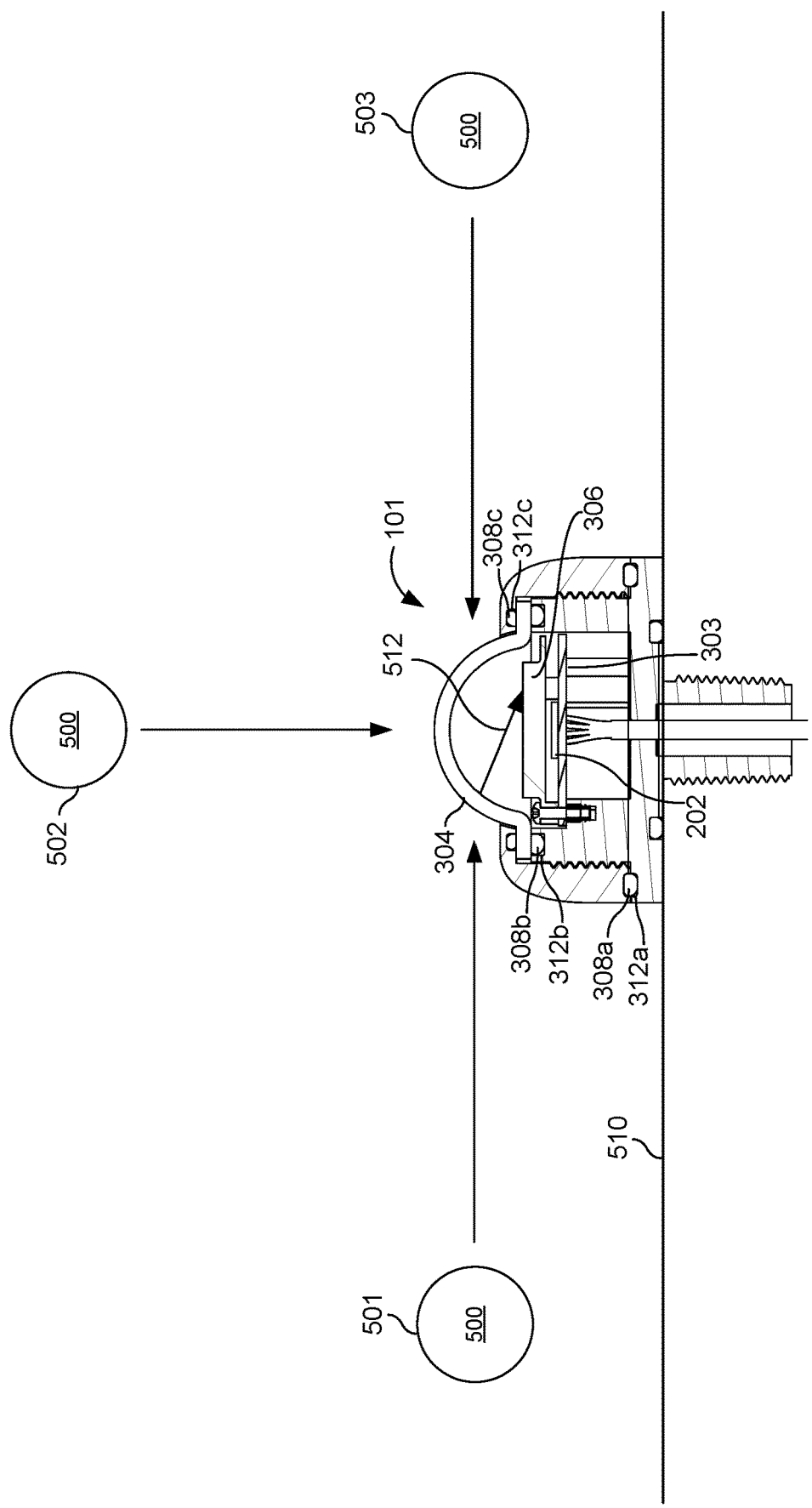

FIG. 5 illustrates a cross-sectional view of the color temperature sensor and its position with respect to sunlight according to an embodiment.

Figure 6:
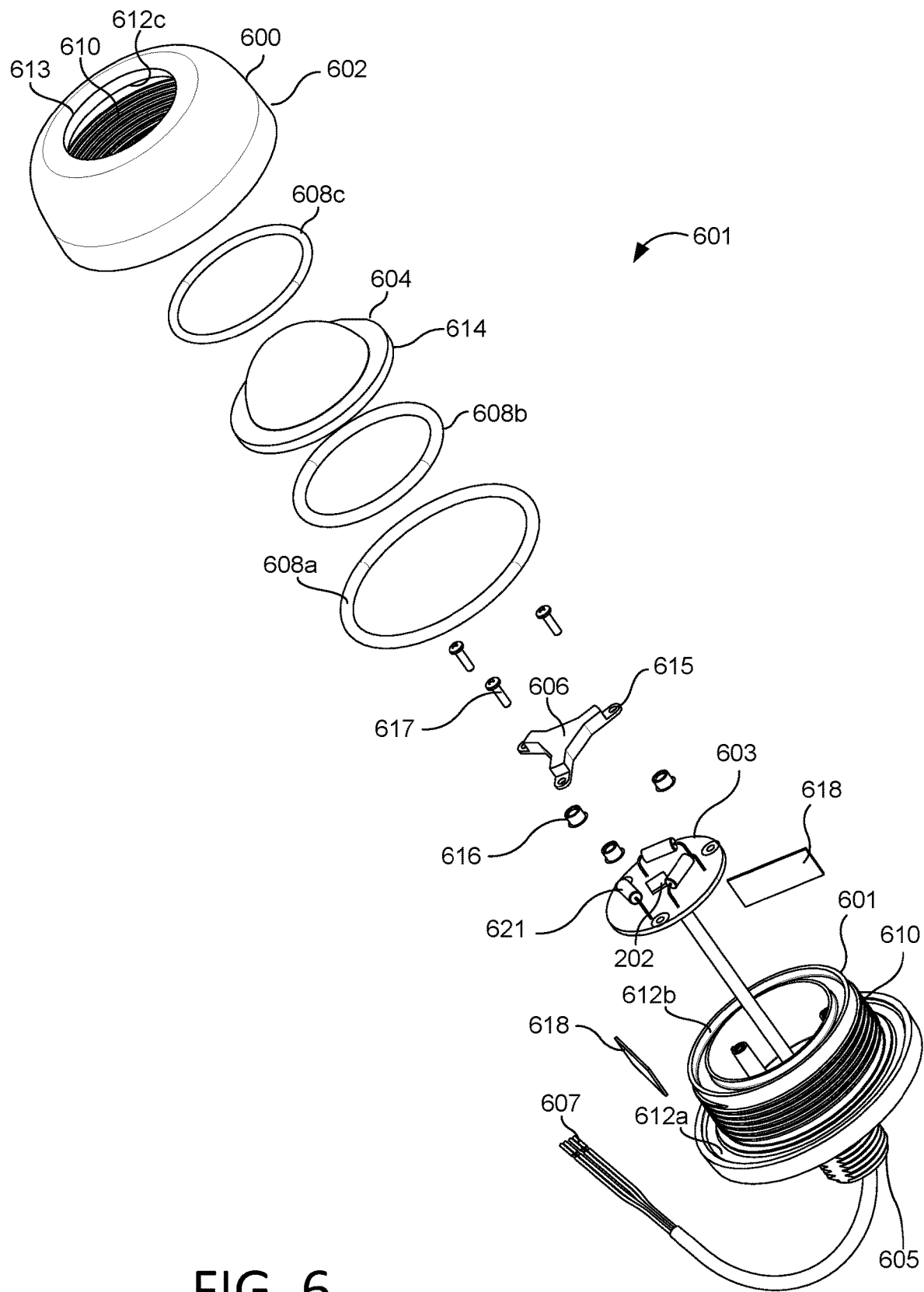

FIG. 6 illustrates an exploded view of a color temperature sensor according to another embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
- 100 Lighting Control System
- 101 Color Temperature Sensor
- 104 Lighting Control Device(s)
- 105 Lighting Control Processor
- 106 Lighting Load(s)
- 108 Junction Box
- 110 Interior Space
- 112 Sunlight
- 201 Processor
- 202 Color Temperature Sensing Module
- 203 Light Intensity Sensing Module
- 204 Temperature Sensing Module
- 205 Memory
- 206 Network Interface
- 209 Visual Indicator
- 210 Power Supply
- 211 Heating Element
- 300 Body
- 301 First Housing Portion
- 302 Second Housing Portion
- 303 Printed Circuit Board (PCB)
- 304 First or Dome Diffuser
- 305 Threaded Chase-Nipple
- 306 Second or Flat Diffuser
- 307 Wire Leads
- 308a-c O-Rings
- 310 Threads
- 312a-c Circumferential Channels
- 313 Opening
- 314 Flange
- 315 Flange
- 316 Standoffs
- 317 Screws
- 400 Flowchart Illustrating the Steps for a Method of Correcting Color Temperature Readings Based on Internal Temperature of the Color Temperature Sensor
- 401-414 Steps of Flowchart 400
- 500 Sun/Sunlight
- 501 Sunrise Position
- 502 Midday Position
- 503 Sunset Position
- 510 Horizon Line
- 512 Angle
- 600 Body
- 601 First Housing Portion
- 602 Second Housing Portion
- 603 Printed Circuit Board (PCB)
- 604 First or Dome Diffuser
- 605 Threaded Chase-Nipple
- 606 Second or Flat Diffuser
- 607 Wire Leads
- 608a-c O-Rings
- 610 Threads
- 612a-c Circumferential Channels
- 613 Opening
- 614 Flange
- 615 Flange
- 616 Standoffs/Spacers
- 617 Screws
- 618 Dehumidifier Pads
- 621 Heating Resistors

LIST OF ACRONYMS USED IN THE SPECIFICATION IN ALPHABETICAL ORDER

The following is a list of the acronyms used in the specification in alphabetical order.
- ADC Using Analog to Digital Converter
- ASIC Application Specific Integrated Circuits
- CAT5 Category 5 Cable
- CCT Correlated Color Temperature
- CPU Central Processing Unit
- $D_{max}$ Maximum Temperature Threshold
- $D_{min}$ Minimum Temperature Threshold
- ESD Electrostatic Discharge
- GUI Graphical User Interface
- HVAC Heating, Ventilation, and Air Conditioning
- IR Infrared
- K Kelvins
- LAN Local Area Network
- LED Light Emitting Diode
- lux Luminous Intensity/Luminosity
- MCU Microcontroller
- NTC Negative Temperature Coefficient
- PCB Printed Circuit Board
- PoE Power over Ethernet
- PMMA Poly(Methyl Methacrylate)
- PTFE Polytetrafluoroethylene
- PWM Pulse Width Modulation
- RAM Random-Access Memory
- RF Radio Frequency
- RGB Red-Green-Blue
- RISC Reduced Instruction Set
- ROM Read-Only Memory
- W White

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of a color temperature sensor, but is not limited thereto, except as may be set forth expressly in the appended claims. Referring to FIG. 1, there is shown a lighting control system 100 comprising a color temperature sensor 101 according to an embodiment. The lighting control system 100 may be adapted to control one or more lighting loads 106 inside an interior space 110 and may further comprise a lighting control processor 105 and one or more lighting control devices 104. The lighting control system 100 may be installed in any type of interior space, such as an office building, conference room, classroom, hospital, retail space, commercial space, residential space, or the like.

According to an embodiment, each lighting load 106 may comprise a color changing light emitting diode (LED) array, such as a tunable white (i.e. 2200K-6000K) array or a full RGB(W) chipset. The lighting load 106 may further comprise an LED driver that controls the LED array to produce desired color and light intensity. The lighting loads 106 may be wired or be wirelessly connected to the control processor 105 to receive control commands and in response change their lighting output.

According to an embodiment, color temperature sensor 101 may be mounted inside or outside a building pointed at the natural light source it meant to measure. For example, the color temperature sensor 101 may be mounted outdoors on a roof in an upward orientation facing the sky to measure the correlated color temperature (CCT) and luminosity (lux) of outdoor natural sunlight 112. Mounting the sensor 101 outdoors in direct view of sunlight 112 will allow more accurate color temperature readings. Accordingly, the sensor 101 needs to withstand extreme weather conditions. The sensor 101 may comprise a threaded chase-nipple 305 (FIG. 3) on its underside that may be used to clamp the sensor 101 to a surface via a threaded conduit nut (not shown). For example, the sensor 101 may be mounted to an outdoor rated junction box 108 mounted on a building via a conduit knockout and may comprise a plurality of wire leads 308 (FIG. 3) extending into the junction box 108 to connect the sensor 101 to the lighting control system 100. Although according to another embodiment, the color temperature sensor unit 101 may be mounted inside the spade 110 in direction facing a window or a skylight to read exterior color temperature through the window.

The color temperature sensor 101 is adapted to detect the exterior color temperature, and more particularly correlated color temperature (CCT), and light intensity or luminosity (lux). According to one embodiment, the color temperature sensor 101 may be directly connected to and directly control the lighting load 106. According to another embodiment, the color temperature sensor 101 is adapted to communicate its reading to the control processor 105 or a lighting control device 104, such as a dimmer, which in turn may interpret the reading to control the interior lighting loads 106. According to yet another embodiment, the color temperature sensor 101 may directly communicate with the LED driver of the lighting load 106, which can interpret the color temperature sensor readings and control the light output of the LED array. In addition, although the control system 100 discussed herein is adapted to control lighting based on the reading of the color temperature of the exterior light source, the color temperature sensor unit 101 readings may be also used to control other types of controllable devices based on outdoor lighting conditions, such as audiovisual devices, shading devices (e.g., motorized roller shades), as well as heating, ventilation, and air conditioning (HVAC) devices, among others.

The color temperature sensor 101 of the present embodiments may be used in various applications. The color temperature sensor 101 may determine the outdoor light color temperature to drive the indoor lighting so as to match the color temperatures of the interior space 110 to that of the exterior lighting conditions. This allows system 100 to maintain the occupants' natural circadian rhythm. This application may also be used for decorative effects, for example, to fool occupants into believing they are outside. This will give the effect of a space that's open to the air, even if such a space may not contain any windows. So during noon hours with exterior color temperature of about 5,500K, the lighting color temperature inside may be adjusted to match that. On the other hand, the interior light color temperature may match the color temperature of an overcast day with a color temperature reading of about 7000K. As a result, the interior space 110 may look like all of the light is coming from the natural lighting source 112 rather than the artificial lighting source 106.

Another application is to determine the outdoor light color temperature conditions and manipulate the interior space to maintain consistent luminous power density, for example of a work surface, no matter what the outdoor conditions are. In another embodiment, in patient care, for example, when the outdoor color temperature readings are undesired, the interior lighting loads 106 may be used to offset that by augmenting interior lighting to a different temperature to improve patient health.

Referring to FIG. 2, there is shown an illustrative block diagram of the color temperature sensor 101 according to an embodiment. Color temperature sensor 101 may include various circuit components configured for detecting color temperature, as well as light intensity, and transmitting its readings or commands to lighting loads 106 either directly or via other control devices, such as 104 and 105.

Color temperature sensor 101 may comprise a power supply 210 configured for providing power to the various circuit components of the color temperature sensor 101. In one embodiment, the power supply 210 may comprise a battery, such as a BR2032 coin cell battery. In another embodiment, sensor 101 may be connected to line voltage. Power supply 210 may further comprise one or more power converters and regulators to provide power levels required by the electrical or circuit components, such as a buck regulator. In addition, the power supply 210 may comprise surge, electrostatic discharge (ESD), misfire, and/or similar protection components or circuits.

Color temperature sensor 101 can further comprise a processor 201. The processor 201 can represent a central processing unit (CPU), one or more microprocessors, "general purpose" microprocessors, a combination of general and special purpose microprocessors, or application specific integrated circuits (ASICs). Additionally, or alternatively, the processor 201 can include one or more reduced instruction set (RISC) processors, video processors, or related chip sets. The processor 201 can provide processing capability to execute an operating system, run various applications, and/or provide processing for one or more of the techniques and functions described herein. The processor 201 can process various commands and perform operations, such as interpreting color temperature and light intensity sensor readings, allowing the color temperature sensor 101 to join a communication network, or the like.

Color temperature sensor 101 can further include one or more memory sources 205, such as a main memory and/or a nonvolatile memory. Memory 205 can be communicably coupled to the processor 201 and can store data and executable code. Memory 205 can represent volatile memory such as random-access memory (RAM), and/or nonvolatile memory, such as read-only memory (ROM), hard disk drive, Flash memory, or the like. Memory 205 can store data files, software for implementing the functions on the control processor 201, as well as network connection information. According to an embodiment, the memory 205 and processor 201 may be incorporated in a single microcontroller (MCU).

Color temperature sensor 101 may further comprise a network interface 206, such as a wired or a wireless interface, configured for bidirectional communication on a communication network with other electronic devices, such as the lighting control device 104, the central control processor 105, or the like. In various embodiments, the wireless interface can comprise a radio frequency (RF) transceiver, an infrared (IR) transceiver, or other communication technologies known to those skilled in the art. The wireless interface may communicate using the infiNET EX® protocol from Crestron Electronics, Inc. of Rockleigh, N.J., ZigBee® protocol from ZigBee Alliance, via Bluetooth transmission, or the like. The wired interface, on the other hand, may be configured for bidirectional communication with other devices over a wired network. The wired interface can represent, for example, an Ethernet or a Cresnet® port or wire leads 307 (FIG. 3). Cresnet® provides a network wiring solution for Creston® keypads, lighting controls, thermostats, and other devices. The Cresnet® bus offers wiring and configuration, carrying bidirectional communication and 24 VDC power to each device over a simple 4-conductor cable.

In various aspects of the embodiments, the network interface 206 and/or power supply 210 can comprise a Power over Ethernet (PoE) interface. The color temperature sensor 101 can receive both the electric power signal and transmit readings or control commands via a communication network through the PoE interface. For example, the PoE interface may be connected through category 5 cable (CAT5) to a local area network (LAN) which contains both a power supply and multiple control points and signal generators.

Color temperature sensor 101 may further comprise a visual indicator 209 to display a status of the sensor 101, identity functionality, as well as for any error reporting for diagnostics. The visual indicator 209 may comprise one or more light emitting diodes (LEDs), such as red and green LEDs. The visual indicator 209 may indicate whether the color temperature sensor 104 is trying to join a network, when it is configured, or the like.

Color temperature sensor 101 may comprise a chromaticity or color temperature sensing module 202 adapted for detecting color temperatures regardless of luminance. The color temperature sensing module 202 may comprise an RGB sensor, a multichannel spectral sensor, an XYZ sensor, or the like, to measure light over a wide spectrum, either narrowband or wideband. According to one embodiment, the color temperature sensing module 202 may comprise a wideband three channel sensor comprising three photodiodes or photosensors for sensing separate color components of light and providing analog channel readings over three channels, including a red channel, a green channel, and a blue channel. The three photodiodes may be covered by an infrared (IR) blocking filter for separating the light into red, green, and blue color values. According to an embedment, the light intensity sensing module 203 may comprise the IR blocking filter for performing the light intensity sensing function. According to another embodiment, the color temperature sensing module 202 may comprise a narrowband six-channel multi-spectral sensor with six photodiodes and Gaussian filters to control the light entering the sensor array. According to yet another embodiment, the color temperature sensing module 202 can comprise a XYZ chromatic white color sensor that provides direct XYZ color coordinates consistent with the CIE 1931 2° Standard Observer color coordinates.

The analog channel readings may be converted using analog to digital converters (ADCs) into digital values. These values may be converted to a correlated color temperature (CCT) reading in Kelvins using a color temperature table or scale. Color temperature is conventionally expressed in Kelvins, using the symbol K, a unit of measure for absolute temperature. Correlated color temperature provides a measurement of the light source color appearance. It is defined by the proximity of the light source's chromaticity coordinates to the blackbody locus or the Planckian curve, which defines the colors of white light. The read color temperature values, which may not be equal to the white colors on the Planckian curve, are correlated to a value that falls on the Planchian curve. Resulting correlated color temperatures at lower color temperature levels (between about 2000K-3500K) are called "warm colors" or "warm white" with yellowish white through orange or reddish appearance. Color temperatures at middle color temperature levels (between about 4000K-5000K) are called "neutral" or "bright white" with more natural white light appearance. On the upper end (above 5500 K), color temperatures are referred as "daylight" with a bluish white appearance.

Color temperature sensor 101 may further comprise a light intensity sensing module 203 configured for detecting and measuring light intensities. According to one embodiment, the color temperature sensing module 202 and the light intensity sensing module 203 may be integrated in the same component. For example the IR blocking filter of the color temperature sending module 202 may act as light intensity sensing module 203 for performing the light intensity sensing function. According to another embodiment, modules 202 and 203 may be separate components. For example, the light intensity sensing module 203 can comprise an internal photocell with 0-65535 lux (0-6089 footcandles) light sensing, such as an open-loop daylight sensor, to measures light intensity from natural daylight. Light intensity sensing module 203 may monitor natural daylight and output a light intensity reading, for example in a form of a luminous intensity (lux) of the observed light. Using the readings, the color temperature sensor 101 can signal the lighting control system 100 to raise or lower the lights according to natural light fluctuations, reducing energy usage while maintaining a consistent light intensity for a more efficient and comfortable work or living space.

Color temperature sensor 101 may further comprise one or more thermal temperature sensing modules 204, such as a negative temperature coefficient (NTC) thermistor. The temperature sensing module 204 may be configured for sensing the inner thermal temperature of the color temperature sensor 101. Because color temperature sensor 101 is meant to be predominantly mounted outdoors, the temperature sensing module 204 may be used to detect snow or icy conditions, which may hinder color temperature and light readings. The color temperature sensor 101 of the present embodiments may further comprise a heating element 211 to prevent ice or snow accumulations on the outer dome diffuser 304 (FIG. 3) of the color temperature sensor 101, which may cover the view of the color temperature sensing module 202 located underneath. For example, the heating element 211 may comprise internal resistors (e.g., 6×20 ohm 1 W resistors in series) capable of dissipating up to 5 W of power. The heating element 211 may be driven by the processor 201 to achieve the desired heat generation, e.g., from about 0 W to about 4.8 W, based on the feedback from the temperature sensing module 204. Both the temperature sending module 204 and heating element 211 may be located on a printed circuit board (PCB) 303 (FIG. 3) within the body 300 of the color temperature sensor 101 and below the outer dome diffuser 304.

As described further below, the thermal temperature sensing module 204 may report its readings to the processor 201, which may control the heating element 211 to maintain the internal temperature of the color temperature sensor 101 above a predetermined minimum temperature threshold, such as 40° C. When the processor 201 receives readings from the temperature sensor 201 indicating that the internal temperature of the color temperature sensor 101 has fallen below the minimum temperature threshold, the processor 201 may turn on the heating element 211 and defer receiving readings from the color temperature sensing module 202 and light intensity sensing module 203 until the internal temperature of the color temperature sensor 101 is above the minimum temperature threshold.

Referring to FIG. 3, there is shown an exploded view of the color temperature sensor 101. Color temperature sensor 101 may comprise a sensor body 300. According to an embodiment, the sensor body may comprise a plastic material, such as polytetrafluoroethylene (PTFE), or Teflon®, or equivalent plastic that can withstand outdoor exposure for a prolonged period of time. The color of the sensor body 300 may comprise a natural white color, which allows the body 101 to reflect and not absorb light and heat. Body 300 may comprise a first housing portion 301 and a second housing portion 302. The first housing portion 301 may comprise the threaded chase-nipple 305 extending from its underside. The second housing portion 302 may threadably attach to the first housing portion 301 via threads 310. One or more o-rings, such as three o-rings 308a-c, may be compressed within various circumferential channels 312a-b between the first and second housing portions 301 and 302 to provide a water tight seal, as shown in greater detail in FIG. 5. The sensor body 300 may house a printed circuit board (PCB) 303, a first diffuser 304, and a second diffuser 306 therein.

The PCB 303 may comprise the various electrical components of the color temperature sensor 101 as discussed above with reference to FIG. 2, including the color temperature sensing module 202. The color temperature sensor 101 may further comprise flying leads 307 connected to the backside of the PCB 303 and extending through and out of the chase-nipple 305. For example, a Cresnet® connection can be implemented via the flying leads 307 to provide communications as well as power to the color temperature sensor 101. According to an embodiment, the PCB 303 may contain the visual indicator 209, such as an LED, thereon, which may be visible through the first and second lenses 304 and 306, to maintain the watertight seal. When turned on, the dome shaped diffuser 304 may diffuse the light emitted from the visual indicator 209 causing the diffuser 304 to light up and provide visual signal to the user.

The first diffuser 304 may be generally domed in shape and may extend out of the sensor body 300 through an opening 313 in the second housing portion 302 to capture sunlight and direct it to the color temperature sensing module 202 on PCB 303. The dome diffuser 304 may comprise a flange 314 configured to be secured between the first hosing portion 301 and the second housing portion 302 to retain the first diffuser 304 by the sensor body 300.

The shape of the dome diffuser helps capture light from all angles, which brings in more light to the sensor and provides more accurate readings. According to an embodiment, the dome diffuser 304 is sufficiently dome shaped in order to gather more incident sunlight from near the horizon line. This allows the color temperature sensor 101 to read color temperatures more accurately during sunrise and sunset. Referring to FIG. 5, there is shown a cross-sectional view of the color temperature sensor 101 according to an embodiment. Because the first diffuser 304 is dome shaped, the sun 500 remains in its view regardless of the sky position of the sun 500. As shown in FIG. 5, the sun 500 is substantially incident or normal to the outer surface of the first diffuser 304 during the entire travel of the sun 500 from sunrise 501, midday 502, and to sunset 503 positions. As such, the dome diffuser 304 can collect light from variety of angles, even when the sun 500 is over the horizon line 510, thereby increasing the optics on the side of the color temperature sensor 101 as it lets light through from a wide area. A flat diffuser or an insufficiently rounded diffuser, on the other hand, will not be able to effectively gather sunlight throughout the day.

The dome diffuser 304 may comprise a white diffused material or layer that is exposed to the sunlight. The dome diffuser 304 may comprise a plastic material, such as polycarbonate, polycarbonate blend, poly(methyl methacrylate) (PMMA), or the like. According to an embodiment, the first diffuser 304 may comprise Panlite® ML-6500ZDL polycarbonate material available from Teijin Limited. In other embodiments, a glass material, acrylic glass, or other similar materials capable of providing sufficient diffusion levels may be utilized. The diffusion of the first diffuser 304 allows light to refract and reflect randomly and thereby scatter around and be collected by the dome diffuser 304. As such, the diffusion of the first diffuser 304 allows the first diffuser 304 to collect natural light, limit glare of the sun, spread light evenly, and reduce hard shadows, thereby preserving the normal color temperature of the sunlight. Diffusing light, instead of focusing light like lenses, allows the color temperature sensor 101 to generate more accurate readings. Using a lens, instead of a dome diffuser 304, on the other hand, will focus light, which will produce inaccurate readings. Although in addition to the dome diffuser 304, the color temperature sensing module 202 may still contain a lens over it to provide a light collecting function.

According to one embodiment, the first diffuser may comprise a diffusion level of about above 50% (with Total-light transmittance (Tt) at about below 50%). However, it is difficult to achieve sufficient as well as consistent diffusion levels throughout the entire surface of a dome shaped diffuser 304 in a cost effective manner. Low diffusion levels do not provide accurate results, while high diffusion levels, for example above 50%, provide better and consistent readings. Materials with high levels of diffusion that can be molded, such as via injection molding, into or onto a dome shape may be cost prohibitive. A cheaper method would be to form a white diffusion layer on the inner surface of the dome diffuser 304. However, this method fails to achieve consistent diffusion levels throughout the entire surface of a dome shaped diffuser. For example, thermoforming a plastic diffusion layer within the dome diffuser 304 causes the plastic layer to get very thin at the top as compared to the sides of the dome diffuser 304, losing diffusion consistency and thereby accuracy of color temperature readings.

Accordingly, the color temperature sensor 101 may comprises a second diffuser 306 positioned underneath the dome diffuser 304—forming a double diffusion construction. The secondary flat diffuser 306 is adapted to further diffuse the light to reduce light concentration and prevent inaccurate readings. The second diffuser 306 may comprise a generally flat shape. The second diffuser 306 may comprise a flange 315 containing standoffs 316 with inner threads that receive screws 317 for mounting the second diffuser 306 and the PCB 303 to the first housing portion 301. The standoffs 316 are adapted to mount the flat diffuser 306 at a distance above the PCB 303.

The second diffuser 306 may comprise a white or white coated glass or plastic material. According to an embodiment, the second diffuser 306 may comprise a polycarbonate material, such as PALSUN® SG White polycarbonate sheet, available from PALRAM Industries Ltd. The second diffuser 306 may comprise diffusion levels of above about 50% (with total-light transmittance (Tt) at about below 50%). For example, the flat diffuser 306 may comprise 28% Total-light transmittance (Tt). Because the second diffuser 306 is flat, consistent diffusion levels can be achieved throughout the entire surface of the second diffuser 306 in an effective and relatively inexpensive manner. The flat shaped diffuser 306 points towards the dome shaped diffuser 304 and is used to collect the light collected by the dome shaped diffuser 304. This allows the use a dome diffuser 304 with higher transmittance levels, such as 65% Total-light transmittance (Tt). However, the second flat diffuser 306 may be also used with a dome diffuser 304 with lower transmittance levels to improve color temperature accuracy. Particularly, referring to FIG. 5, the second flat diffuser 306 is also used to collect sunlight that comes in at a steep angle, such as angle 512, with respect to the color temperature sensing module 202 during sunrise 501 and sunset 503. The second diffuser 306 collects the light and directs it down where it is read by the color temperature sensing module 202. By further diffusing the incoming light, the second diffuser 306 eliminates any further dark shadows and prevents it from becoming dark or dull. Because the incoming light is sufficiently diffused via the double diffusion layers 304 and 306, it substantially retains its natural color temperature, which is read by the color temperature sensing module 202, resulting in substantially accurate readings.

According to an embodiment, the first and/or second diffuser 304/306 further comprise materials with weather resistance characteristics. Materials such as polycarbonates and PMMA do not yellow over time like other plastics and can withstand outdoor conditions. In addition, the first and/or second diffuser 304/306 can comprise materials with ultraviolet (UV) radiation blocking properties, for example via UV protection films or co-extruded UV protection layers on one or two sides of the diffuser. UV radiation blocking properties allow the transmission of the natural daylight while reflecting the sun's heat due to infrared radiation. This both reduces the deterioration of the diffusers themselves, as well as reducing the heat buildup in the color temperature sensor 101.

According to an embodiment, to compensate for the double diffusion layers 304 and 306, the light intensity or brightness readings of the light intensity sensing module 203 may be adjusted by an offset and/or gain factor.

Referring to FIG. 6, there is shown an exploded view of a color temperature sensor 601 according to another embodiment. Color temperature sensor 601 may comprise substantially the same configuration as color temperature sensor 101 shown in FIG. 3. It may comprise a sensor body 300 having a first housing portion 601 connected to a second housing portion 602 via threads 610. Color temperature sensor 601 may further include one or more o-rings 608a-c to provide a water tight seal. In addition, the sensor body 600 may house a printed circuit board (PCB) 603, a first dome diffuser 604, and a second flat diffuser 606 therein.

The PCB 603 may comprise various electrical components as discussed above with reference to FIG. 2, including the color temperature sensing module 202 and heating element 211 in the form of three heating resistors 621. The first diffuser 604 may comprise substantially same configuration and material properties as the first diffuser 304 discussed above. The second diffuser 606 may comprise a generally flat shape with similar configuration and material properties as second diffuser 306 discussed above. The second diffuser 606 may reside over the PCB 603 at a distance using spacers 616. However, instead of having a circular shape and being positioned over the heating element 211, the second diffuser 606 may comprise a triangular shape with cutouts to expose the heating resistors 621 such that the second diffuser 606 resides in between and adjacent to the heating resistors 621 without covering them. In addition, the color temperature sensor 601 may comprise one or more dehumidifier pads 618 disposed within the sensor body 600 which may comprise porous material to collect moisture that gets into the unit and prevent the diffusers 604 and 606 from fogging up for more accurate readings.

Referring now to FIG. 4, there is shown a flowchart illustrating the steps for a method of correcting the color temperature readings, as well as the light intensity readings, based on the internal temperature of the color temperature sensor 101, according to an illustrative embodiment. In step 401, the processor 201 receives a thermal temperature level (D) from the temperature sensing module 204. In step 402, the processor 201 determines whether the received temperature level (D) is equal to or below a minimum temperature threshold ($D_{min}$), for example 40° C. If so, in step 403, the heating element 211 is turned on. While the heating element 211 is on, the processor 201 rejects color temperature and light intensity readings from sensor modules 202 and 203 in step 404. The processor 201 then samples the temperature sensing module 204 in step 405 and compares the received temperature level (D) to the minimum temperature threshold ($D_{min}$) in step 406. If the receive temperature level (D) equals to or is still below the minimum temperature threshold ($D_{min}$), the process returns to step 403 and the processor 201 maintains the heating element 211 on to raise the internal temperature of the color temperature sensor 101. When the received temperature level (D) goes above the minimum temperature threshold ($D_{min}$), the processor 201 turns off the heating element 211 in step 407. As such, the heating element 211 is maintained on until the internal temperature rises above the minimum temperature threshold ($D_{min}$). According to an alternative embodiment, the heating element 211 may be instead maintained on for a predetermined time period.

After turning off the heating element 211, the processor 201 defers the readings from the color temperature and light intensity sensor modules 202 and 203 for a predetermined time period (T), for example, for about 10 minutes. This allows any accumulated snow or ice on the color temperature sensor 101 to melt. Specifically, in step 408, the processor 201 increments a timer and checks whether the timer has reached the predetermined time period (T) in step 409. If the timer is below the predetermined time period (T), the timer is again incremented in step 408. If the timer is equal or above the predetermined time period (T), the timer is cleared in step 410 and the processor 201 goes back to check the internal temperature of the color temperature sensor 101 in step 401. If the received temperature level (D) is still below the minimum temperature threshold ($D_{min}$), the process in steps 403 through 410 repeats.

If the received temperature level (D) is above the minimum temperature threshold ($D_{min}$), the processor 201 checks whether the received temperature level (D) equals to or is above the maximum temperature threshold ($D_{max}$). The internal temperature of the color temperature sensor 101 may be excessively high due to the heat generated by the heating element 211 or due to excessive heat generated by the sun. Excessive heat may cause color or chromaticity shift in the readings by the color sensing and light intensity modules 202 and 203. This may cause errors in the color temperature and light intensity readings. As such, when the received temperature level (D) equals to or is above the maximum temperature threshold ($D_{max}$), the processor 201 may offset the color temperature and light intensity readings in step 416. According to one embodiment, the processor 201 may offset the color temperature and light intensity readings by predetermined color temperature and light intensity offset values. According to another embodiment, the processor 201 may store a color shift curve or table that plots color temperature shift versus the internal thermal temperature of the color temperature sensor 101. The processor 201 may compare the received temperature level (D) with the stored color shift curve to determine the color temperature shift or offset value. The processor can use that color temperature shift or offset value to offset color temperature readings from the color temperature sensing module 202 in step 416. Similar chart or table can be stored for light intensity levels to offset the light intensity readings received from the intensity sensing module 203 based on the received thermal temperature level (D) of the color temperature sensor 101.

The processor 201 continues to monitor the internal thermal temperature levels of the color temperature sensor 101 in step 401. If the received thermal temperature level (D) is above the minimum temperature threshold ($D_{min}$) in step 402 and below the maximum temperature threshold ($D_{max}$) in step 412, then the processor 201 receives color temperature and light intensity readings from sensor modules 202 and 203 in step 414. Using the above process, the processor 201 may compensate and correct any fluctuations in color temperature readings based on the internal thermal temperature of the color temperature sensor 101.

INDUSTRIAL APPLICABILITY

The disclosed embodiments provide a system, software, and a method for a color temperature sensor. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted. For example, [ ].

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A color temperature sensor assembly comprising:
   a sensor body comprising an opening;
   a first diffuser extending through the opening in the sensor body and comprising a substantially dome shaped surface;
   a second diffuser disposed within the sensor body below the first diffuser and comprising a substantially flat shaped surface, wherein the second diffuser comprises a material with a diffusion level that is higher than a diffusion level of a material of the first diffuser; and
   a color temperature sensing module disposed below the second diffuser and adapted to detect a color temperature of light collected by the first diffuser and the second diffuser.

2. The color temperature sensor assembly of claim 1, wherein the sensor body comprises a white plastic material adapted to reflect light.

3. The color temperature sensor assembly of claim 1 further comprising a light indicator disposed below the first diffuser, wherein the first diffuser is adapted to diffuse and disperse the light emitted from the light indicator to provide visual signal to a user.

4. The color temperature sensor assembly of claim 1, wherein the first diffuser is adapted to capture light at angles incident to the dome shaped surface of the first diffuser and scatter the light within the first diffuser.

5. The color temperature sensor assembly of claim 4, wherein the second diffuser is adapted to further diffuse the light captured by the first diffuser and direct the light towards the color temperature sensing module.

6. The color temperature sensor assembly of claim 4, wherein the second diffuser is adapted to reduce dark shadows within the sensor body.

7. The color temperature sensor assembly of claim 1, wherein the second diffuser is adapted to collect light that comes in at a steep angle with respect to the first diffuser and direct the light towards the color temperature sensing module.

8. The color temperature sensor assembly of claim 1, wherein the first diffuser and the second diffuser comprise a white diffused material.

9. The color temperature sensor assembly of claim 1, wherein at least one of the first diffuser and the second diffuser comprises a material with ultraviolet blocking properties adapted to allow transmission of natural daylight and to reflect infrared radiation.

10. The color temperature sensor assembly of claim 1 further comprising at least one heating element disposed below the first diffuser, wherein the heating element is adapted to be selectively turned on to melt ice or snow accumulation on the first diffuser.

11. The color temperature sensor assembly of claim 10, wherein the heating element is further disposed below the second diffuser.

12. The color temperature sensor assembly of claim 10, wherein the second diffuser comprises at least one cutout adapted to expose the heating element.

13. The color temperature sensor assembly of claim 1, wherein the second diffuser comprises a substantially circular shape.

14. The color temperature sensor assembly of claim 1, wherein the second diffuser comprises a substantially triangular shape.

15. The color temperature sensor assembly of claim 1 further comprising at least one dehumidifier pad within the sensor body adapted to collect moisture and reduce fog accumulation on the first diffuser and the second diffuser.

16. The color temperature sensor assembly of claim 1, wherein the first diffuser comprises a flange; wherein the sensor body comprises a first housing portion threadably attached to a second housing portion; wherein each of the first housing portion and the second housing portion comprises a circumferential channel adapted to receive an o-ring; wherein the flange of the first diffuser is adapted to be disposed between the circumferential channel of the first housing portion and the circumferential channel of the second housing portion such that the o-rings are compressed against the flange to form a water tight seal.

17. The color temperature sensor assembly of claim 1 further comprising at least one processor adapted to receive a color temperature reading from the color temperature sensing module and control at least one lighting load based on the color temperature reading.

18. The color temperature sensor assembly of claim 17 further comprising a light intensity sensing module, wherein the processor is adapted to compensate for the diffusion of the first diffuser and the second diffuser by adjusting a light intensity reading of the light intensity sensing module by an offset factor, wherein the processor is adapted to control at least one lighting load based on the adjusted light intensity reading.

19. A color temperature sensor assembly comprising:
a sensor body comprising an opening;
a first diffuser extending through the opening in the sensor body and comprising a substantially dome shaped surface;
a second diffuser disposed below the first diffuser and comprising a substantially flat shaped surface; and
a color temperature sensing module disposed below the second diffuser and adapted to detect a color temperature of the light collected by the first diffuser and the second diffuser; and
a light indicator disposed below the first diffuser, wherein the first diffuser is adapted to diffuse and disperse light emitted from the light indicator to provide visual signal to a user.

20. A color temperature sensor assembly comprising:
a sensor body comprising an opening;
a first diffuser extending through the opening in the sensor body and comprising a substantially dome shaped surface;
a second diffuser disposed within the sensor body below the first diffuser and comprising a substantially flat shaped surface; and
a color temperature sensing module disposed below the second diffuser and adapted to detect a color temperature of light collected by the first diffuser and the second diffuser;
wherein at least one of the first diffuser and the second diffuser comprises a material with ultraviolet blocking properties adapted to allow transmission of natural daylight and to reflect infrared radiation.

21. A color temperature sensor assembly comprising:
a sensor body comprising an opening;
a first diffuser extending through the opening in the sensor body and comprising a substantially dome shaped surface;
a second diffuser disposed within the sensor body below the first diffuser and comprising a substantially flat shaped surface;
a color temperature sensing module disposed below the second diffuser and adapted to detect a color temperature of light collected by the first diffuser and the second diffuser; and
at least one heating element disposed below the first diffuser, wherein the second diffuser comprises at least one cutout adapted to expose the heating element, wherein the heating element is adapted to be selectively turned on to melt ice or snow accumulation on the first diffuser.

22. A color temperature sensor assembly comprising:
a sensor body comprising an opening;
a first diffuser extending through the opening in the sensor body and comprising a substantially dome shaped surface;
a second diffuser disposed within the sensor body below the first diffuser and comprising a substantially flat shaped surface;
a color temperature sensing module disposed below the second diffuser and adapted to detect a color temperature of light collected by the first diffuser and the second diffuser;
a light intensity sensing module; and
at least one processor adapted to receive a color temperature reading from the color temperature sensing module and control at least one lighting load based on the color temperature reading;

wherein the processor is further adapted to compensate for the diffusion of the first diffuser and the second diffuser by adjusting a light intensity reading of the light intensity sensing module by an offset factor, wherein the processor is adapted to control the at least one lighting load based on the adjusted light intensity reading.

* * * * *